United States Patent [19]
Barker et al.

[11] Patent Number: 5,830,602
[45] Date of Patent: Nov. 3, 1998

[54] CARBONACEOUS ACTIVE MATERIAL AND METHOD OF MAKING SAME

[75] Inventors: Jeremy Barker, Henderson, Nev.; Rene Koksbang, Odense S, Denmark

[73] Assignee: Valence Technology, Inc., Henderson, Nev.

[21] Appl. No.: 802,977

[22] Filed: Feb. 20, 1997

[51] Int. Cl.$^6$ .................................................. H01M 4/58
[52] U.S. Cl. ................. 429/218; 423/415.1; 423/449.6; 205/414; 205/419
[58] Field of Search .................................... 205/414, 419, 205/422, 423, 427; 423/415.1, 449.6; 429/218

[56] References Cited

U.S. PATENT DOCUMENTS

| | | | |
|---|---|---|---|
| 4,105,455 | 8/1978 | Koga et al. | 106/44 |
| 4,497,787 | 2/1985 | Schilling et al. | 423/345 |
| 4,510,024 | 4/1985 | Kishida et al. | 204/59 R |
| 4,517,265 | 5/1985 | Bélanger et al. | 429/217 |
| 4,546,163 | 10/1985 | Haluska | 528/14 |
| 4,832,895 | 5/1989 | Johnson | 269/29.1 |
| 4,959,281 | 9/1990 | Nishi et al. | 429/194 |
| 5,176,969 | 1/1993 | Miyabayashi et al. | 429/212 |
| 5,225,296 | 7/1993 | Ohsawa et al. | 429/218 |
| 5,232,795 | 8/1993 | Simon et al. | 429/192 |
| 5,326,658 | 7/1994 | Takahashi et al. | 429/194 |
| 5,348,818 | 9/1994 | Asami et al. | 429/213 |
| 5,362,493 | 11/1994 | Skotheim et al. | 429/194 |
| 5,418,091 | 5/1995 | Gozdz et al. | 429/252 |
| 5,456,000 | 10/1995 | Gozdz et al. | 29/623.2 |
| 5,460,904 | 10/1995 | Gozdz et al. | 429/192 |
| 5,498,493 | 3/1996 | Dahn et al. | 429/218 |
| 5,567,297 | 10/1996 | Mertens et al. | 205/414 X |
| 5,624,606 | 4/1997 | Wilson et al. | 423/449.6 X |
| 5,639,576 | 6/1997 | Lewis et al. | 429/218 |

OTHER PUBLICATIONS

Zheng et al. "Lithium Insertion in Hydrogen–Containg Carbonaceous Materials", Chem. Mater. vol. 8, No. 2, pp. 389–393, 1996 (Month unknown).

R. Morrison and R. Boyd, "Organic Chemistry," Chapter 8, 2nd Edition, 1969 (Month N/A).

R. Morrison and R. Boyd, "Organic Chemistry," Chapter 32, 3rd Edition, 1994 (Month N/A).

L. McNally and C.W. Allen, "Polymerization of Vinyl Derivatives of the Main–Group Elements," Heteroatom Chemistry, vol. 4, No. 2/3, 159–174, 1993 (Month unknown).

J. Petitjean, S. Aeiyach, C.A. Ferreira, and P.C. Lacaze, "New Oscillatory Electrochemical Phenomenon Observed in the Electropolymerization of Pyrrole in MeCN+ N(Bu)$_4$PF$_6$ on an Iron Electrode Studied by the Ring–Disk–Electrode Technique," J. Electrochem. Soc., vol. 142, No. 1, 136–142, Jan. 1995.

*Primary Examiner*—Stephen Kalafut
*Attorney, Agent, or Firm*—Linda Deschere

[57] ABSTRACT

The present invention provides an electrochemical cell or battery which has a non-metallic negative electrode (anode). That is, no solid metal, free metal, active material is used in the cell. Rather than the conventional solid lithium metal anode, the active material of the new electrode comprises substituted carbon active material. The substituted carbon is carbonaceous material arranged in a disordered or ordered graphite structure, where atoms of carbon have been substituted in such structure by at least one other element. The invention also provides carbonaceous materials which are non-graphitic and considered amorphous, non-crystalline, highly disordered, which also have substituted therein elements other than carbon. The invention also provides a process for making such substituted carbons and for preparing an anode containing the substituted carbon.

18 Claims, 2 Drawing Sheets

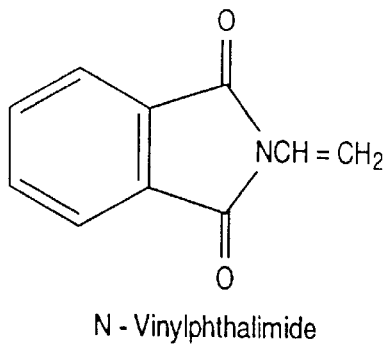
N - Vinylphthalimide
FIG. 1
CH₃CH₂COOCH = CH₂
Vinyl Propionate
FIG. 2
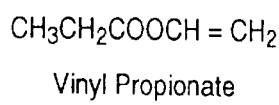
2 - Vinylpyrazine
FIG. 3
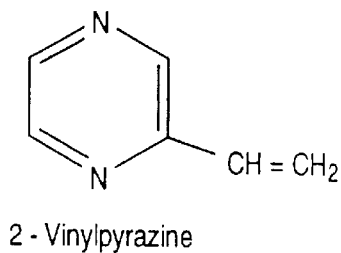
2 - Vinylpyridine
FIG. 4
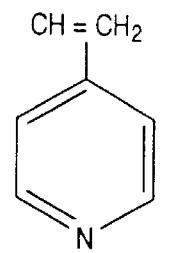
4 - Vinylpyridine
FIG. 5
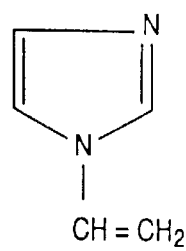
1 - Vinylimidazole
FIG. 6
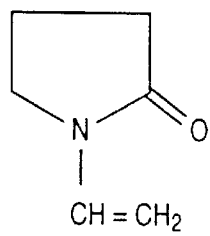
1 - Vinyl - 2 - Pyrrolidinone
FIG. 7
H₂C = CHSi (CH₃)₃
Vinyltri (methyl) silane
FIG. 8

$H_2C = CHSi(C_6H_5)_3$
Vinyltri (phenyl) silane
FIG. 9
$H_2C = CHSiCl_3$
Vinyltri (chloro) silane
FIG. 13
$C_4H_7NO_2$
DL - Vinylglycine
FIG. 10
$H_2C = CHSi(OCH_3)_3$
Vinyltri (methoxy) silane
FIG. 14
$C_4H_7NO_2$
L - Vinylglycine
FIG. 11
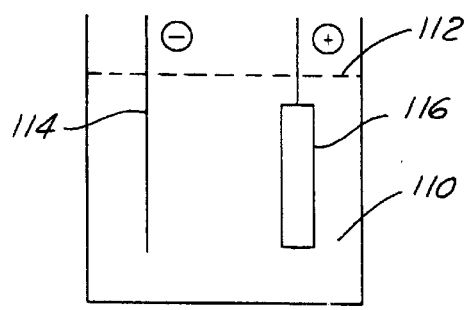
FIG. 15
$(H_2C = CH)_2SO_2$
Vinyl Sulfone
FIG. 12
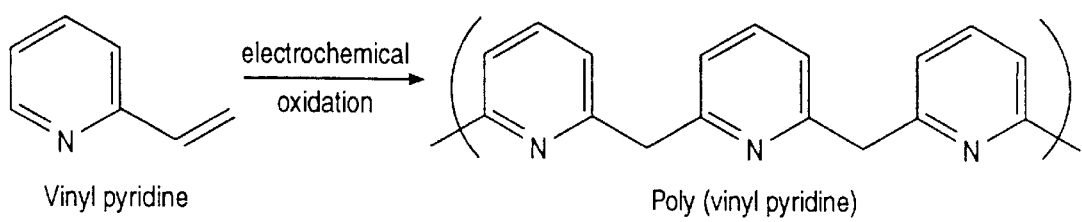
Vinyl pyridine → electrochemical oxidation → Poly (vinyl pyridine)
FIG. 16
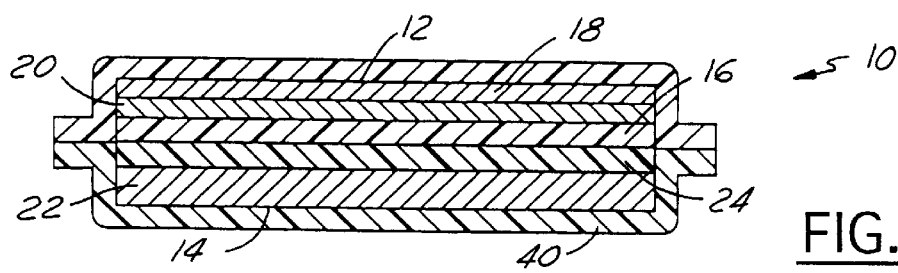
FIG. 17

CARBONACEOUS ACTIVE MATERIAL AND METHOD OF MAKING SAME

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells. Such cells have included an anode (negative electrode) of metallic lithium, a cathode (positive electrode) typically a transition metal chalcogenide, and an electrolyte interposed between electrically insulated, spaced apart, positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The lithium metal anode has been replaced with a carbon anode, that is, a carbonaceous material, such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art. Such carbon anodes may be prelithiated prior to assembly within the cell having the cathode intercalation material.

One drawback of the carbon anode is that upon initial charging of the cell, when lithium is intercalated into the host carbon, some irreversibility occurs in which lithium and/or the cell electrolyte are consumed, resulting in an initial capacity loss for the cell and a reduction of the cell's overall performance. For example, when the anode material $Li_xC$ is prepared in situ in a cell in order to obtain a state of charge and render the anode to a reduced state, some of the lithium which is transferred to the anode upon initial charging, is irretrievably intercalated into the anode in an irreversible process. Some of the intercalated lithium is, therefore, not deintercalated from the anode during subsequent discharge resulting in the loss of capacity since lithium is not available for electrochemical interaction to produce electrical energy. The progressive loss of capacity during use is referred to as "capacity fade". What is needed is good capacity and good cycle performance, maintaining such capacity over a large number of cycles. Another drawback to carbon anodes is that there is not an effective method to prepare the carbonaceous active material in particle form, having optimized desired electrochemical properties. For example, coke is easy to make, but is a poor performer. Highly graphitized carbons are desired, but it is difficult to maintain controlled conditions for formation. Such carbons have limited lithium capacity, i.e. limited to $LiC_6$ (372 mAh/g).

SUMMARY OF THE INVENTION

The present invention provides an electrochemical cell or battery which has non-metallic negative electrode (anode) and which does not contain any solid metal, free metal active material. The performance of the anode (negative electrode) of the present invention is an improvement over carbon anodes and approaches the performance of conventional solid lithium metal anode, but without the disadvantages of metal anodes. The invention also provides a method for producing the novel anode active material. The negative electrode active material of the invention is a carbon active material comprising disordered carbon, carbon black, coke, graphitized carbon, or any mixture of the carbons. Regardless of the carbon material selected, the carbon material has an ordered or disordered structure formed by carbon atoms wherein atoms of the element (E) have been substituted for a minor portion of the carbon atoms in the active material. The element (E) is bonded to at least one carbon atom in the carbon active material. The substituted carbon active material is characterized by a greater lithium insertion capacity as compared to unsubstituted carbon active material. In a preferred embodiment, the negative electrode comprises an electro-active carbon material formed by carbon atoms wherein atoms of element (E) have been substituted for a minor portion of the carbon atoms of the ordered or disordered carbon-structure. The type of carbon is dependent on post heat treatment (HT), it may have disordered carbon (HT<2000° C.) or graphite structure (HT>2400° C.).

It is preferred that the element (E) is selected from the group consisting of nitrogen (N), oxygen (O), and elements adjacent to the elements carbon (C), nitrogen, and oxygen in Columns 13 through 16 of the Periodic Table. Groups 13, 14, 15, and 16 of the Periodic Table are according to the IUPAC proposal since 1985, previously these groups were respectively referred to as Groups 3B, 4B, 5B, and 6B (old IUPAC recommendation) and previously referred to as Groups IIIA, IVA, VA, and VIA (Chemical Abstracts Service Group notation). Besides nitrogen and oxygen, the elements adjacent to carbon, nitrogen, and oxygen in Columns 13 through 16 of the Periodic Table include boron, aluminum, silicon, phosphorous, and sulfur. Among these, electron donor elements, nitrogen (N), oxygen (O), silicon (Si), sulfur (S), phosphorous (P), and mixtures thereof are preferred. Only a minor portion of the carbon atoms in the graphite-structure is substituted with the heteroatom, element (E), this means that the heteroatom, element (E), is substituted for less than 50 atomic percent of said carbon atoms. Most preferably, the heteroatom constitutes less than 50 percent by weight of the total weight of the carbon and heteroatom and the heteroatom constitutes less than 50 atomic percent of the total number of carbon atoms and heteroatoms. There is essentially no theoretical lower limit to the amount of element (E) which may be substituted because any amount of included element (E) replacing carbon will improve the lithium insertion capacity of the carbon active material. Mixtures of the substitute element (E) may be used. The substituted carbon active material of the invention is characterized by a higher voltage versus a lithium metal comparative electrode, as compared to an unsubstituted carbon active material.

The method for producing the novel carbonaceous material of the invention which has a dopant element (E) different from carbon comprises providing vinyl monomers having the general formula:

where G represents a pendant group comprising at least one element which is different from carbon. The vinyl monomers are electro-polymerized to form polymers having said vinyl monomeric units. Then, the polymer is pyrolized to form a carbonaceous active material which includes the heteroatom element (E), with carbon constituting the largest portion by weight of the carbonaceous material and the heteroatom element (E) constituting the second largest portion. It is preferred that in the vinyl monomer the group G is a heterocyclic hydrocarbon ring compound. It is desirable that pendant group G comprises at least one element selected from the group consisting of nitrogen, oxygen, and elements adjacent to elements carbon, nitrogen, and oxygen in Columns 13 through 16 of the Periodic Table. It is preferred that the element (E) be selected from the group consisting of boron, nitrogen, oxygen, sulfur, and silicon. It is most preferred that the element (E) be an electron donor. Desirably, the group G is a nitrogen, sulfur, phosphorous, or oxygen heterocyclic hydrocarbon ring structure. It is desirable that the vinyl monomer is selected from the group consisting of vinyl heterocyclic compounds, vinylsilane compounds, vinyl hydronitrogen compounds, and vinyl hydrofuran compounds. It is most preferred that the vinyl monomer is selected from the group consisting of vinyltri(methyl)silane; vinyltri(phenyl)silane; dl-vinylglycine; L-vinylglycine; vinyl sulfone; 1-vinyl-2-pyrrolidinone; vinyltri(methoxy)silane; vinyltri(chloro)silane; 2-vinylpyridine; 4-vinylpyridine; vinylphthalimide; vinyl propionate; 2-vinyl-1-pyrazine; vinylimidazole; and mixtures thereof. In the method of the invention, for pyrolysis, the heating may occur under various conditions depending on the desired end product. The higher the temperature, the greater will be the degree of order. The range is from disordered carbon at lower temperatures to highly crystallized graphite at higher temperatures. Heating at a temperature in excess of about 2400° C. forms a graphitized, relatively ordered graphite carbon. Heating at lower temperatures forms a relatively disordered non-graphitic carbon. In each of the aforesaid cases, heating for approximately 2 hours is thought to be sufficient. When the heating occurs at a relatively low temperature sufficient to release all or most of the hydrogen, the invention forms a carbonaceous material in the form of non-graphitic carbon black or coke. For best results, the heating occurs at a temperature which provides the carbonaceous material in the form of graphite having fused carbon ring structures arranged in layers. The degree of order desired in the end product will affect the selection of heating temperature. The heteroatom should be selected to be stable so that it does not volatilize from the product.

An important step in the method of forming carbonaceous material is the electro-polymerization. This is conducted by providing a working electrode opposite a counter-electrode in an electrochemical cell. The cell contains an electrolyte solution consisting essentially of an organic solvent and an electrolyte salt which does not contain a metal species. An organic salt is preferred. A current is impressed across the cell at a potential sufficient to electrochemically oxidize the vinyl monomer to a polymer and deposit the polymer on a surface of the working electrode. It is desired that the solvent be an organic solvent. Acetonitrile is an acceptable solvent. The selection of the solvent is not critical so long as it does not interfere with the electrochemical polymerization and it does not decompose or evaporate under electro-polymerization. Desirably, the salt is an organic salt which, when dissolved in the solvent, forms a positively charged organic species (cation) and an anion such as $BF_4^-$, $ClO_4^-$, $AsF_6^-$, $PF_6^-$ and the like. In one preferred embodiment, the monomer is vinylpyridine, the solvent is acetonitrile, and the salt is $(C_2H_5)_4NPF_6$. It is preferred that the monomer and the salt each have a 1 molar concentration in the electro-polymerization cell. Other concentrations may be used.

Objects, features, and advantages of the invention include an improved electrochemical cell or battery based on lithium which has good charging and discharging characteristics, a large discharge capacity, which maintains its integrity over a prolonged life cycle, and which is able to be produced relatively economically, and relatively easily, and rapidly. Another object is to provide a method for forming anode (negative electrode) active material which lends itself to commercial scale production providing for ease of preparing large quantities.

These and other objects, features, and advantages will become apparent from the following description of the preferred embodiments, claims, and accompanying drawings.

BRIEF DESCRIPTION OF THE DRAWINGS

FIGS. 1 through 14 contain illustrations of compounds useful as monomeric units to form polymers according to the invention. The compounds are: N-Vinylphthalimide (FIG. 1); Vinyl Propionate (FIG. 2); 2-Vinylpyrazine (FIG. 3); 2-Vinylpyridine (FIG. 4); 4-Vinylpyridine (FIG. 5); 1-Vinylimidazole (FIG. 6); 1-Vinyl-2-pyrrolidinone (FIG. 7) Vinyltri(methyl)silane (FIG. 8); Vinyltri(phenyl)silane (FIG. 9); DL-Vinylglycine (FIG. 10); L-Vinylglycine (FIG. 11); Vinyl Sulfone (FIG. 12); Vinyltri(chloro)silane (FIG. 13); and Vinyltri(methoxy)silane (FIG. 14).

FIG. 15 is an illustration of an electrochemical deposition vessel 100.

FIG. 16 is an illustration of the basic reaction for preparation of poly (vinylpyridine) from vinyl pyridine. The reaction occurs in exemplary acetonitrile solvent containing an organic salt $(C_2H_5)_4NPF_6$.

FIG. 17 is an illustration of a cross-section of a thin battery or cell which has a negative electrode active material prepared according to the invention.

DETAILED DESCRIPTION OF THE PREFERRED EMBODIMENTS

The present invention provides an electrochemical cell or battery which has a non-metallic negative electrode (anode). That is, no solid metal, free metal, active material is used in the cell. Rather than the conventional solid lithium metal anode, the active material of the new electrode comprises substituted carbon active material. The substituted carbon is carbonaceous material arranged in a disordered or ordered graphite structure, where atoms of carbon have been substituted in such structure by at least one other element. The invention also provides carbonaceous materials which are non-graphitic and considered amorphous, non-crystalline, highly disordered, which also have substituted therein elements other than carbon. The invention also provides a process for making such substituted carbons and for preparing an anode containing the substituted carbon.

Before describing the invention, it is useful to understand the problems associated with present batteries. Generally, the carbonaceous materials (carbons) known to be usable as intercalation carbon anode materials may, for discussion purposes, be classified in several distinct groups. One group contains highly structured, highly crystalline, highly graphitic, anisotropic graphites having a nearly perfect layered structure and preferably formed as synthetic graphites and heat treated up to about 3000° C. Examples are the SFG and the KS graphites as supplied by the manufacturer Lonza G. & T., Limited (Sins, Switzerland). A second distinct group contains graphitic carbons which have relatively very large crystal size ($L_c$ greater than 2000) and are fully graphitized. BG grades from Superior are purified natural graphite. A third class of carbons are non-graphitic carbons. These are considered amorphous, non-crystalline, disordered, and are generally petroleum cokes and carbon blacks, such as, supplied by Lonza under the designation FC-250 and Conoco (USA) under the designation XP and X-30. They have a turbostratic (disordered) structure, show a steep voltage profile and intercalate only up to 0.5 Li per $C_6$ ($Li_{0.5}C_6$, $LiC_{12}$). Petroleum coke is usable in combination with a variety of electrolytes without excessive deterioration of the electrolyte solvent. However, the performance of such petroleum cokes is relatively poor due to sloping voltage profile and limited intercalation capacity. Further, such cokes are only able to intercalate about 1 atomic unit of lithium for each 12 atomic units of carbon. Graphite has a higher lithium intercalation/deintercalation capacity, theoretically about 1 atomic unit of lithium for each 6 atomic units of carbon. It has double the intercalation capacity, and a flat voltage curve near zero volts relative to lithium. The theoretical capacity of a graphite anode is 372 mAh/g based upon 1:6 of Li:C. Despite these theoretical advantages, graphites have a relatively low lithium capacity as measured in amp hours per gram, compared to metallic lithium. However, metallic lithium electrodes suffer degradation when a solid surface layer of dendritic powder isolates the lithium electrode both physically and electrically from the main body of the metallic electrode.

In U.S. Pat. No. 4,517,265, Belanger et al have proposed an anode composition based on a mixture of plastic or elastomeric macromolecular material with ionic conduction, particles of an alloy of lithium, and particles of carbon. These anodes contain metallic lithium and metallic alloys thereof. Their performance declined rapidly with use due to dendritic powder formation on the particles of metal. In U.S. Pat. No. 4,959,281, Nishi et al suggested a negative electrode (anode) which consists entirely of a carbonaceous material. Since carbon is known to have a capacity lower than lithium and other metals, Nishi's anodes have relatively low capacity, as measured in ampere hours per kilogram. Thus, although Nishi avoids problems encountered with metallic lithium, anodes having better performance in terms of capacity are desirable.

The invention provides a new electrode material based on doped or substituted carbon and provides a method of preparing the electrode material. Such new material provides higher lithium capacity as measured in amp hours per gram and higher electrode (anode) voltage. The preparation method comprises the steps of polymerizing vinyl compounds having select precursor pendent groups; and then pyrolizing the polymers to generate carbon materials having substituted therein certain desired elements in place of a portion of the atomic carbon.

The present invention utilizes a novel polymerization and pyrolysis reaction sequence. The polymerization reaction involves free radicals in the presence of an initiator. In the case of electropolymerization, the reaction is initiated essentially electrochemically. Reaction occurs at the doubly bonded carbons, such as, in vinyl groups and is called vinyl polymerization. In the case of chemical polymerization, initiation and propagation is caused by an initiator, such as, an oxidation agent, for example, peroxide. For purposes of the present invention, a wide variety of unsaturated monomeric precursors may be used to yield polymers with different pendent groups. The constituents of the pendent group are selected based on the desired element to be substituted for carbon in the final pyrolysis product.

The polymerization reaction is propagated by the consecutive formation of radicals at the vinyl group, which then causes the vinyl groups to continue to attach to each other. Eventually, the reaction is terminated by steps that consume, but do not form, free radicals in the case of chemical polymerization. Thus, after a radical is formed in chemical initiation, the radical adds to the double bonded monomer until reaction is terminated. Compounds can be added to the polymerization solution to achieve the desired average molecular weight of the final product.

In the case of electrochemical polymerization, an electrolytic polymerization reactor is used and preferably contains opposed electrodes. An electrolyte solution is prepared containing the monomeric precursors. Direct current is supplied from the DC generator between the electrodes and the electrolytic solution, thereby carrying out the electrolytic polymerization. The rate of polymerization is controlled by adjusting current density to achieve the desired result.

The preferred monomeric precursors usable in the invention are vinyl monomers. It is preferred that such vinyl monomers contain heteroatoms and preferably have a ring structure. It is possible to have the different element (heteroatom) in the ring, or as a substituent off of the ring. The different element, refers to an element different from carbon which is substituted for carbon in the final product. Such element is also referred to as a dopant element. It is to be understood that the dopant element forms a part of the final carbonaceous material. The dopant element is not simply deposited as a separate particle onto the carbon. In other words, the present invention is different from Belanger, U.S. Pat. No. 4,517,265. In Belanger, composite anodes contained particles of a lithium aluminum alloy and particles of carbon. In Belanger, the alloy particles and the graphite particles are mixed. In contrast, in the present invention, no free metallic particles are used. Rather, the dopant constituent is not a separately existing particle, since the dopant element is bonded to the carbon atoms in the carbonaceous pyrolysis product. The preferred vinyl monomer precursor containing the dopant element has the general formula:

where G represents a pendent group comprising at least one element (E) which is different from carbon and which is different from hydrogen. Such vinyl monomers are polymerized to form a polymer. Then, the polymer is pyrolized to form a carbonaceous material in which the element (E) is included and forms a part of the carbonaceous material. It is preferred that the polymerization process be conducted electrochemically. It is preferred that the element (E), which is substituted for carbon, form a minor portion, by weight, of the pyrolysis carbonaceous product. Desirably, the element (E) is selected from the group consisting of nitrogen and oxygen and elements adjacent to the elements carbon, nitrogen, and oxygen in Columns 13 through 16 of the Periodic Table. Groups 13, 14, 15, and 16 are according to the IUPAC proposal (since 1985), previously referred to as Groups 3B, 4B, 5B, and 6B (old IUPAC recommendation) and previously referred to as Groups IIIA, IVA, VA, and VIA (Chemical Abstracts Service Group notation). Desirable elements are nitrogen, oxygen, silicon, sulfur, boron, and phosphorous. These elements, when a part of an organic compound, are referred to by the prefix organo, such as organosilicon, organonitrogen, and the like. These are organic compounds of the respective element (E). The preferred elements are electron donors. It is thought that in order to optimize a cell, an electron donor is needed. It is preferred that in the vinyl monomer, the G group is a heterocyclic hydrocarbon ring compound containing one of the preferred heteroatoms (element E). It is preferred that the G group is a nitrogen, sulfur, oxygen, silicon, boron, or phosphorous heterocyclic hydrocarbon ring. By way of example, the vinyl monomer may be selected from heterocycles, polycycles, and polyhetero systems. They are, by further example, vinylsilane compounds, vinyl hydronitrogen compounds, vinylsulfones, vinyl organosilicons, vinyl organophosphorus compounds, and vinyl organoborons. More specific examples are vinyltri(methyl)silane; vinyltri(phenyl)silane; dl-vinylglycine; L-vinylglycine; vinylsulfone; 1-vinyl 2-pyrrolidinone; vinyltri(methoxy) silane; vinyltri(chloro)silane; 2-vinyl pyridine; 4-vinyl pyridine; vinylphthalimide; vinyl propionate; 2-vinyl 1-pyrazine; vinylimidazole; and mixtures thereof. FIGS. 1 through 14 contain exemplary monomeric units.

The average molecular weight of the polymerized product is not critical. The polymerization reaction should continue for a period of time sufficient for the polymerized molecule (polymer) to precipitate out of solution. It is thought that on the order of 20 repeating units will be sufficient to obtain a solid precipitated product. After polymerization, pyrolysis is conducted in order to carbonize the polymer. This means heating to an elevated temperature sufficient to remove hydrogen and to leave behind a residue comprising carbon and the substitute element (E). An amorphous carbonaceous material or a graphitic carbonaceous material may be prepared. It is thought that pyrolyzing at about 900° C. to about 1000° C. for 2 hours is sufficient to release most of the hydrogen of the polymer or leave behind just a few percent by weight hydrogen. A disordered carbon is achieved at temperatures up to about 2000° C. At temperatures in excess of about 2400° C. full graphitization is approached or achieved. Accordingly, the pyrolysis occurs at a temperature which provides the carbonaceous material in a desired condition and the duration and temperature of heating is selected to provide an amorphous condition, a non-graphitic carbon black or coke, or a graphite having fused carbon ring structure arranged in essentially regular layers, or a disordered non-graphitic carbon depending on what is desired. In the final pyrolized product, it is desired that the carbonaceous material have carbon constituting the largest proportion by weight and the dopant or substitute element (E) constituting the second largest portion by weight.

Generalized polymerization reactions by free radical mechanism in the presence of an initiator are known and are described in Chapter 8 of "Organic Chemistry," 2nd Edition, by R. Morrison and R. Boyd, 1969 and in Chapter 32 of "Organic Chemistry," 3rd Edition, by R. Morrison and R. Boyd, published in 1994. Generalized mechanism for polymerization of vinyl derivatives including copolymerization of different monomers is described in "Polymerization of Vinyl Derivatives of the Main Group Elements," by L. McNally and C. Allen in "Heteroatom Chemistry," Vol. 4, No. 2/3, 1993. McNally and Allen show initiation in the presence of various types of catalysts and effective means for increasing yield, included are vinyl derivatives containing the desirable heteroatoms used in the present invention. Finally, J. Petitjean et al describe general methods for electrochemical polymerization in an article entitled "A New Oscillatory Electrochemical Phenomenon Observed in the Electropolymerization of Pyrrole in MeCN+N(Bu)$_4$PF$_6$ on an Iron Electrode Studied by the Ring-Disk-Electrode Technique," in the Journal of Electrochemical Society, Vol. 142, No. 1, January 1995. Note that Petitjean does not describe polymerization of a vinyl monomer. Yet, Petitjean provides general system description for electropolymerization of pyrrole and provides general teachings regarding the influence of concentration and other variables on catalytic oxidation to initiate polymerization. These references provide general examples of polymerization techniques known in the art. Such techniques are useful to form the precursor polymeric materials used in the invention. Of these techniques, electropolymerization according to the invention is preferred and provides good control of polymerization conditions. The method of the invention also results in unexpectedly high yields.

Pyrolysis of the polymer is conducted to obtain the aforesaid carbon or graphitic material. Pyrolysis is the process for breaking organic chemical bonds by heating. It is also known as destructive distillation, thermal depolymerization, thermal cracking, thermolytic distillation, carbonization, and coking. The temperature must be sufficient to crack the polymer, yet not be so high as to cause chemical reaction or degradation of the carbon black. It should be noted that, for comparison, volatile matter is removed from coal at a temperature of between 900° C. and 1000° C., and more typically 925° C. (1700° F.) and 980° C. (1800° F.) in the absence of oxygen. For many organic materials, pyrolysis begins at a temperature of about 250° C. It is expected that the lowest temperature at which organic material is completely pyrolized is at about 370° C. The lower the pyrolysis temperature, the longer will be the heating time. It is known that relatively simple alkyl organic materials may be heated to a temperature of about 450° C. to 550° C. to achieve pyrolysis. However, as stated earlier, the structure of the pyrolysis product, carbon, is highly dependent on the pyrolysis temperature. Where the heating occurs at a temperature in excess of about 1000° C. and approaching 2000° C. or 3000° C., graphite crystallites are highly aligned and approach the theoretical limit for crystalline graphite, with minimized variability from lot to lot. Such variability is observed with ordinary graphites prepared at the earlier mentioned lower temperatures.

EXAMPLE

In the present invention, electropolymerization, such is conducted in an electrochemical deposition vessel 100 as shown in FIG. 15. The vessel 100 includes a reservoir 110 which contains an electrolyte solution consisting essentially of an organic solvent and an electrolyte salt. It is preferred that the electrolyte salt not contain a metal species. The cell contains first and second (112 and 114) electrodes arranged opposite to one another. One electrode 112 is the working electrode where deposition of the polymer 116 occurs. The second electrode 114 is the counter electrode. A potential difference is applied between electrodes 112 and 114 to cause deposition of the polymer.

In this example (FIG. 16), polyvinylpyridine is electrochemically oxidized to vinylpyridine. The heteroatom (element E) is nitrogen. The reservoir contains the aforesaid counter electrode and working electrode. The reservoir contains 1 molar vinylpyridine in an acetonitrile solution using 1 molar $(C_2H_5)_4N^+PF_6^-$. The electrodes are stainless steel. The electrochemical reaction caused by the potential difference produces a solid polymer at the working electrode. This polymer is then extracted.

In the reaction example of FIGS. 15 and 16, the organic solvent is acetonitrile (MeCN), however, the solvent is not critical to the invention. It should be an organic solvent that will dissolve the selected monomer and supporting electrolyte. Others which may be selected are benzonitrile, propylene carbonate, dimethyl carbonate, and tetrahydrofuran. The salt used in the example is an organic salt which forms a positively charged organic species cation $((C_2H_5)_4N^+)$ and anion $(PF_6^-)$. It is thought that concentrations of monomer in the range of 0.1 molar to 2 molar and concentrations of salt in the range of 0.1 molar to 2 molar would also be satisfactory.

The process of the invention provides carbonaceous materials (carbons) usable as intercalation carbon anode materials. Advantageously, the method provides highly structured, highly crystalline, highly graphitic, anisotropic graphites having a layered structure and heat treated up to about 3000° C. A second type of carbonaceous material produced by the invention comprises graphitic carbons which are fully graphitized, typically, graphitized cokes. If desired, it is also possible to prepare, at relatively lower heating temperatures, carbons which are non-graphitic carbons. These are considered amorphous, non-crystalline, and disordered. This example serves as a teaching tool for a general synthesis route for forming carbonaceous material of the invention. Several general reaction schemes and electrolytes can be used, as well as, different vinyl monomer precursors, as will be readily apparent to those skilled in the art.

Referring to FIG. 17, an electrochemical cell or battery 10 has a negative electrode side 12, a positive electrode side 14, and an electrolyte/separator 16 therebetween. A description of the electrochemical cell or battery which uses the novel active material of the invention will now be described. By convention, an electrochemical cell comprises a first electrode, a counter electrode which reacts electrochemically with the first electrode, and an electrolyte which is capable of transferring ions between the electrodes. A battery refers to one or more electrochemical cells. Referring to FIG. 17, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes are typically referred to as polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used, that is stable up to 4.5 volts or more. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,418,091; 5,456,000; 5,460,904; 5,463,179; and 5,482,795. Each of the above patents is incorporated herein by reference in its entirety. Protective bagging material 40 covers the cell and prevents infiltration of air and moisture.

Electrodes of the invention are made by mixing a binder, the active material, and carbon powder (particles of carbon). The binder desirably is a polymer. A paste containing the binder, active material, and carbon is coated onto a current collector. The positive electrode may comprise any of a number of metal chalcogenide active materials, desirably, metal oxide active materials. Preferred active materials include $LiCoO_2$, $LiMn_2O_4$, and $LiNiO_2$. For the positive electrode, the content is typically as follows: 50 to 90 percent by weight active material; 5 to 30 percent carbon black as the electric conductive diluent; and 3 to 20 percent binder, preferably chosen to enhance ionic conductivity. Stated ranges are not critical. The amount of active material may range from 25 to 85 weight percent. These materials are mixed and blended together with a solvent. Zylene is a suitable solvent. The mixture is then coated onto a current collector to achieve the desired thickness for the final electrode. The negative electrode of the invention preferably comprises about 80 to about 95 percent by weight of the specific graphite, and more preferably about 95 percent by weight, with the balance constituted by the binder. Preferably, the anode is prepared from a graphite slurry using polyvinylidene difluoride (PVDF) in a solvent along with the carbon particles. The slurry is coated onto a current collector using conventional application techniques.

The electrolyte used to form a completed cell may comprise any of a number of solvents, such as ethylene carbonate (EC), dimethyl carbonate (DMC), and mixtures thereof. The solvent contains typically a 1 molar solution of a lithium metal salt, such as $LiPF_6$. The positive and negative electrodes are maintained in a separated, spaced apart condition using a fiberglass layer or separator of an equivalent design.

Various methods for fabricating electrochemical cells and batteries and for forming electrode components are further described immediately below. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; and 4,830,939 (Lee & Shackle). Each of the above patents is incorporated herein by reference in its entirety.

The present invention has advantages over other techniques, such as, chemical vapor deposition (CVD). The CVD technique consists essentially of vaporizing a precursor followed by deposition and reaction on a hot surface. This method is not known to be suitable or adaptable for production of powder active materials. Powder active material is the desired product prepared by the novel method of the invention. The CVD technique produces very thin films rather than individual particles of carbonaceous material required for electrode preparation.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

We claim:

1. A method for producing a carbonaceous material which has a dopant element different from carbon, comprising:

a. providing vinyl monomers having the general formula:

where G represents a pendant group comprising at least one element which is different from carbon;

b. electro-polymerizing said vinyl monomers to form a polymer; and c. heating said polymer to pyrolize the polymer thereby forming a carbonaceous material which includes said at least one element, with carbon constituting the largest portion by weight of said carbonaceous material and said at least one element constituting the second largest portion.

2. The method according to claim 1 wherein said at least one element is selected from the group consisting of N, O, and elements adjacent to elements C, N, and O in Columns 13 through 16 of the Periodic Table.

3. The method according to claim 1 wherein the G group is a heterocyclic hydrocarbon ring compound.

4. The method according to claim 1 wherein the G group is a nitrogen, sulfur, phosphorous, or oxygen heterocyclic hydrocarbon ring structure.

5. The method according to claim 1 wherein the vinyl monomer is selected from the group consisting of vinyl heterocyclic compounds, vinylsilane compounds, vinyl hydronitrogen compounds, and vinyl hydrofuran compounds.

6. The method according to claim 1 wherein the vinyl monomer is selected from the group consisting of vinyltri(methyl)silane; vinyltri(phenyl)silane; dl-vinylglycine; L-vinylglycine; vinyl sulfone; 1-vinyl-2-pyrrolidinone; vinyltri(methoxy)silane; vinyltri(chloro)silane; 2-vinylpyridine; 4-vinylpyridine; vinylphthalimide; vinyl propionate; 2-vinyl-1-pyrazine; vinylimidazole; and mixtures thereof.

7. The method according to claim 1 wherein the heating occurs at a temperature which provides said carbonaceous material in an amorphous condition.

8. The method according to claim 1 wherein the heating occurs at a temperature which provides said carbonaceous material in the form of non-graphitic carbon black or coke.

9. The method according to claim 1 wherein the heating occurs at a temperature which provides said carbonaceous material in the form of graphite having fused carbon ring structures arranged in layers.

10. The method according to claim 1 wherein the heating occurs at a temperature less than 2000° C. to form a disordered non-graphite carbon.

11. The method according to claim 1 wherein the heating occurs for about 2 hours at a temperature in excess of about 2400° C. to form a graphitized relatively ordered graphite carbon.

12. The method according to claim 1 wherein said electro-polymerizing is conducted by:

i. providing a working electrode opposite a counter-electrode in an electrochemical cell containing an electrolyte solution consisting essentially of an organic solvent and an electrolyte salt which does not contain a metal species; and ii. impressing a current across the cell at a potential sufficient to electrochemically oxidize said vinyl monomer to a polymer and deposit said polymer on a surface of said working electrode.

13. The method according to claim 12 wherein said organic solvent is acetonitrile and said salt is an organic salt which, in said solvent, forms a positively charged organic species (cation) and a $PF_6$ (anion).

14. The method according to claim 12 wherein said monomer is vinylpyridine.

15. A method for increasing the lithium insertion capacity of a carbon active material selected from the group consisting of disordered carbon, carbon black, coke, and graphitized carbon, said method comprising substituting carbon atoms of an element E for a minor portion of carbon atoms in said carbon active material, said portion being less than 50 percent of said carbon atoms; said element E being bonded to at least 1 carbon atom in said carbon active material and being selected from the group consisting of N, O, and elements adjacent to elements C, N, and O in Columns 13 through 16 of the Periodic Table, provided said element E is an electron donor; said substituted carbon characterized by greater lithium insertion capacity as compared to unsubstituted carbon active material.

16. A method for increasing the lithium insertion capacity of a carbon active material selected from the group consisting of disordered carbon, carbon black, coke, and graphitized-carbon, said method comprising:

a. providing vinyl monomers having the general formula:

where G represents a pendant group comprising at least one element which is different from carbon;

b. electro-polymerizing said vinyl monomers to form a polymer;

c. heating said polymer to pyrolize the polymer thereby forming a carbonaceous material which includes said at least one element, said element substituted for a minor portion of carbon atoms in said carbonaceous material, with carbon constituting the largest portion by weight of said carbonaceous material and said at least one element constituting the second largest portion;

d. forming an anode electrode by mixing said substituted carbonaceous material with a binder and applying said mixture to a current collector; and e. assembling a battery comprising said anode electrode, a counter-electrode forming an electrochemical couple with said anode, and an electrolyte disposed between said anode and said counter-electrode.

17. A lithium ion battery comprising a positive electrode, an electrolyte, and a negative electrode, said negative electrode comprising an electro-active graphite-structured material formed by carbon atoms wherein atoms of element E have been substituted for a minor portion of said carbon atoms of said graphite structure, said element E being selected from the group consisting of N, O, and elements adjacent to elements C, N, and O in Columns 13 through 16 of the Periodic Table, provided said element E is an electron donor.

18. The lithium ion battery according to claim 17 wherein said electron donor element is selected from the group consisting of N, O, Si, S, P, and mixtures thereof.

* * * * *